US007176930B2

(12) United States Patent
Eitzmann

(10) Patent No.: US 7,176,930 B2
(45) Date of Patent: Feb. 13, 2007

(54) REDUCING FILL AND IMPROVING QUALITY OF INTERLACED DISPLAYS USING MULTI-SAMPLING

(75) Inventor: Gregory M. Eitzmann, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 278 days.

(21) Appl. No.: 10/978,906

(22) Filed: Nov. 1, 2004

(65) Prior Publication Data

US 2005/0088368 A1 Apr. 28, 2005

Related U.S. Application Data

(63) Continuation of application No. 10/163,740, filed on Jun. 6, 2002, now Pat. No. 6,870,543.

(51) Int. Cl.
*G09G 5/36* (2006.01)
*H04N 11/20* (2006.01)

(52) U.S. Cl. .................................... 345/545; 348/446

(58) Field of Classification Search ................ 345/545
See application file for complete search history.

(56) References Cited

U.S. PATENT DOCUMENTS 5,233,411 A * 8/1993 Nam et al. .................. 358/500
5,369,739 A * 11/1994 Akeley ....................... 345/626
5,446,498 A * 8/1995 Boon ......................... 348/448
5,559,953 A * 9/1996 Seiler et al. ................ 345/543
5,877,771 A * 3/1999 Drebin et al. ............... 345/586
5,987,215 A * 11/1999 Kato et al. .................. 386/112
6,061,094 A * 5/2000 Maietta ...................... 348/446
6,064,437 A * 5/2000 Phan et al. ................. 348/446
6,091,425 A * 7/2000 Law .......................... 345/619
6,104,413 A * 8/2000 Cheng et al. ............... 345/552
6,130,723 A * 10/2000 Medin ........................ 348/607
6,281,933 B1 * 8/2001 Ritter ......................... 348/447
6,529,249 B2 * 3/2003 Hashemi ..................... 348/714
6,587,158 B1 * 7/2003 Adams et al. .............. 348/716
6,664,955 B1 * 12/2003 Deering ...................... 345/418
6,670,959 B2 * 12/2003 Wasserman et al. ........ 345/535

(Continued)

*Primary Examiner*—Ryan Yang
(74) *Attorney, Agent, or Firm*—Woodcock Washburn LLP

(57) ABSTRACT

The present invention provides a system, method and computer program product for reducing fill and improving quality of interlaced displays using multi-sampling. In an embodiment of the invention, a frame buffer for a interlaced display is filled. Initially, a first multi-sample of the first line of the first field is calculated. The bottom sub-pixels of the first multi-sample are the top sub-pixels of a multi-sample of the first line of the second field. The first multi-sample is written into the frame buffer. Then, a second multi-sample of the second line of the first field is calculated. The top sub-pixels of the second multi-sample are the bottom sub-pixels of a multi-sample of the first line of the second field. Also, the bottom sub-pixels of the second multi-sample are the top sub-pixels of the second line of the second field. The second multi-sample is written into the frame buffer. A multi-sample for each subsequent line of the first field is calculated in this manner and written into the frame buffer. Then, a last multi-sample consisting of the bottom sub-pixels of a full multi-sample of the last line of the second field is calculated. The last multi-sample is also written into the frame buffer.

3 Claims, 9 Drawing Sheets

U.S. PATENT DOCUMENTS

| | | | | |
|---|---|---|---|---|
| 6,720,975 | B1 * | 4/2004 | Dietrich, Jr. | 345/611 |
| 2002/0191104 | A1 * | 12/2002 | Matsutani et al. | 348/441 |
| 2003/0043158 | A1 * | 3/2003 | Wasserman et al. | 345/545 |

* cited by examiner

REDUCING FILL AND IMPROVING QUALITY OF INTERLACED DISPLAYS USING MULTI-SAMPLING

CROSS-REFERENCE TO RELATED CASES

This application is a continuation of U.S. patent application Ser. No. 10/163,740 filed Jun. 6, 2002 now U.S. Pat. No. 6,870,543, entitled "Reducing Fill And Improving Quality Of Interlaced Displays Using Multi-Sampling" which is herein incorporated by reference in its entirety.

BACKGROUND OF THE INVENTION

1. Field of the Invention

The present invention relates generally to the field of computer graphics. More specifically, the present invention relates to the field of computer graphics for interlaced displays.

2. Related Art

The two most commonly used means of refreshing (i.e., displaying images on) a Cathode Ray Tube (CRT) display are progressive scanning and interlaced scanning. Progressive scanning, used by most computer displays, starts at the top of the image, scans the first line of the image and then scans each subsequent line of the image. Interlaced scanning starts at the top of the image, scans the first even-numbered line of the image, scans each subsequent even-numbered line of the image, returns to the top of the image and then proceeds to scan the odd-numbered lines of the image. Interlaced scanning reduces bandwidth by requiring less data during each of the two passes on the CRT. Interlaced scanning, however, does not come without drawbacks.

Because interlaced scanning displays only one half of the lines of an image at a time, images with high-frequency vertical information tend to flicker or have other visual aberrations, reducing visual accuracy. In addition. conventional interlaced scanning fills the frame buffer with an entire image before scanning. Thus, at any given time, the frame buffer contains twice as many lines than are needed for each of the two passes (once for even-numbered lines and once for odd-numbered lines), which is an inefficient use of fill resources.

Accordingly, there exists a need for a method for reducing fill and improving quality of interlaced displays.

SUMMARY OF THE INVENTION

The present invention provides a system, method and computer program product for reducing fill and improving quality of interlaced displays using over-sampling. In an embodiment of the invention, a frame buffer for an interlaced display is filled. Initially, a first multi-sample of the first line of the first field is calculated. The bottom sub-pixels of the first multi-sample are the top sub-pixels of a multi-sample of the first line of the second field, i.e., the bottom sub-pixels of the first multi-sample are over-sampled. The first multi-sample is written into the frame buffer. Then, a second multi-sample of the second line of the first field is calculated. The top sub-pixels of the second multi-sample are the bottom sub-pixels of a multi-sample of the first line of the second field, i.e., the top sub-pixels of the second multi-sample are over-sampled. Also, the bottom sub-pixels of the second multi-sample are the top sub-pixels of the second line of the second field, i.e., the bottom sub-pixels of the second multi-sample are over-sampled. The second multi-sample is written into the frame buffer. A multi-sample for each subsequent line of the first field is calculated in this manner and written into the frame buffer. Then, a last multi-sample consisting of the bottom sub-pixels of a full multi-sample of the last line of the second field is calculated. The last multi-sample is also written into the frame buffer.

In an embodiment of the present invention, upon fetch, a multi-sample of a line of a field is read from the frame buffer and a resultant line is calculated from the multi-sample before the resultant line is provided to the interlaced display.

In another embodiment of the present invention, the frame buffer is filled with one field at a time at field rate.

An advantage of the present invention is the decrease in the frame buffer size requirement. Whereas a typical frame buffer fill method requires two times N multi-sampled lines (where N is the number of multi-sampled lines in a field) of frame buffer space, the present invention requires only N+1 multi-sampled lines of frame buffer space. This allows for more efficient use of memory and reduces read/write operations.

Another advantage of the present invention, is the increase in image quality. The present invention reduces vertical high frequency data which causes flickering and other unwanted visual effects. Increased image quality allows for easier viewing by users and the more accurate display of data.

Yet another advantage of the present invention is a reduction in fill processing. Because there is less information being written into the frame buffer, there is less fill processing required. This allows for a more efficient use of processing resources.

Yet another advantage of the present invention is a reduction in fill processing due to calculation of resultant lines upon fetch and not upon fill (as described above). This allows for a more efficient use of processing resources. Furthermore, the frame buffer is filled with one field at a time at field rate. That is, the frame buffer is refreshed with a new field at field rate, as opposed to refreshing the frame buffer with a new frame at frame rate. This allows for the fill processing to occur at the same rate as the display which results in better synchronization of the system.

Further embodiments, features and advantages of the present invention as well as the structure and operation of the various embodiments of the present invention are described in detail below with reference to the accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention. In the drawings.

Figure 1:
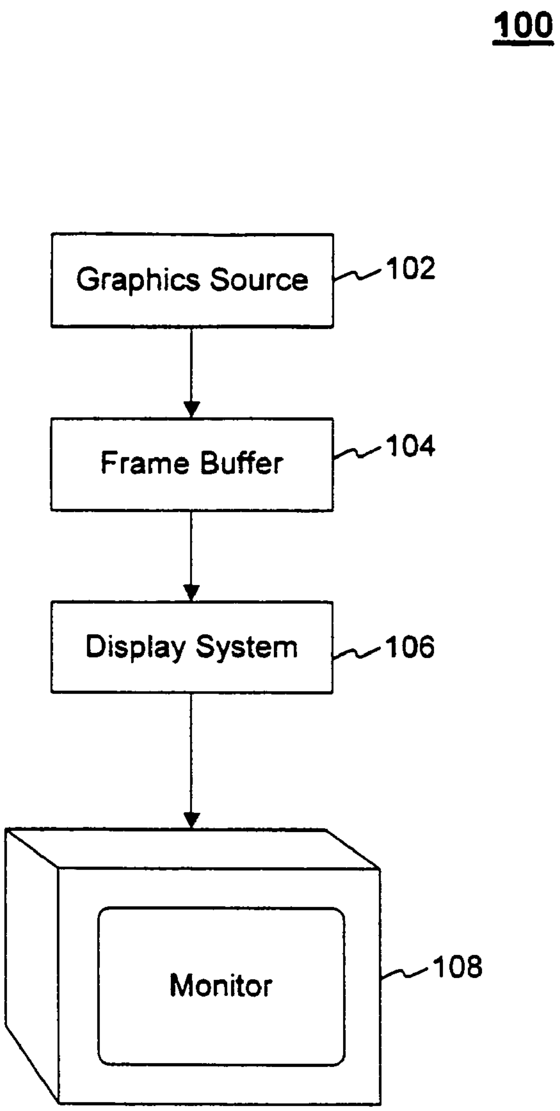
FIG. 1 is a block diagram illustrating the system architecture of a graphics and display system in an embodiment of the present invention, showing connectivity among the various components.

The present invention will now be described with reference to the accompanying drawings. In the drawings, like reference numbers represent identical or functionally similar elements. Additionally, the left-most digits of a reference number identify the drawings in which the reference number first appears.

DETAILED DESCRIPTION OF THE PREFERRED EMBODIMENTS

Discussion

The present invention is directed towards a system method and computer program product for reducing fill and improving quality of interlaced displays using multi-samples. The present invention is described in terms of a software environment. Description in these terms is provided for convenience only. It is not intended that the present invention-be limited to application in this example environment. In fact, after reading the following description, it will become apparent to the person skilled in the relevant art how to implement the invention in alternative environments known now or developed in the future.

Terminology

To more clearly delineate the present invention, an effort is made throughout the specification to adhere to the following term definitions as consistently as possible.

The term "frame" is used to refer to a single image in a sequence of images. A video clip consists of multiple frames.

The terms "interlacing" and "interlaced scanning" are used to refer to a video display technique in which only half of the horizontal lines of a frame are drawn with each pass (for example, all odd lines on one pass and all even lines on the next pass). An interlaced frame consists of two fields: a first field and a second field. One field consists of the even-numbered lines of the frame while the other field consists of the odd-numbered lines in the field.

The term "NTSC" is an abbreviation for National Television Standards Committee. NTSC sets the video standards in the United States. The NTSC standard for television is a video signal with a refresh rate of 30 interlaced frames per second. Each frame contains 525 lines and can contain 16 million different colors.

The term "PAL" is an abbreviation for Phase Alternating Line which is the television standard in Europe. The PAL standard for television is a video signal with a refresh rate of 25 interlaced frames per second. Each frame contains 625 lines.

The term "buffer" is used to refer to a temporary storage area on a computer. A buffer is usually located in RAM. The purpose of most buffers is to act as a holding area, enabling the CPU to manipulate data before transferring it to a device. A "frame buffer" is a buffer that is used to hold frame information before it is transferred to the display system.

The term "refresh" is used to refer to the rate at which a frame buffer is updated with new information.

The term "multi-sampling" is used to refer to the use of multiple source pixels to define one target pixel. Multi-sampling can be used together with an algorithm, such as an averaging algorithm, in which a group of source pixels are weighted together to calculate the value of one target pixel. Multi-sampling can also be used, for example, when an image is decreased in size by one half. In this example, every four pixels of the source image are averaged to produce one target pixel.

The term "multi-sample" is used to refer to a group of source pixels. A "multi-sampled pixel" refers to a pixel for which multiple source pixels exist. A "multi-sampled line" refers to a line for which multiple source pixels exist.

The term "sub-pixel" is used to refer to one of a group of source pixels in a multi-sample.

The term "resultant pixel" is used to refer to a target pixel which is calculated from a multi-sample, i.e., multiple source (or sub) pixels. In a multi-sampled line, the target line is referred to as the "resultant line."

The term "over-sampling" is used to refer to the use of overlapping source groups. Over-sampling occurs when one source pixel belongs to more than one source groups, i.e., multi-samples. Thus, the value of the source pixel is used in the calculation of more than one target pixel.

The term "fill" is used to refer to the act of populating a frame buffer.

Filling encompasses the tasks of calculating the data that will be written to the frame buffer and writing to the frame buffer. Calculating the data that will be written to the frame buffer can include calculating multi-samples.

The term "fetch" is used to refer to the act of obtaining desired data from data stored in a frame buffer. Fetching usually refers simply to the task of reading data, such as a frame or a field, from a frame buffer. In the present invention, the term "fetch" is used to refer to the acts of reading multi-samples from the frame buffer and calculating target lines or target pixels from the multi-samples. Fetching is usually accomplished by the display system.

Overview of the Present Invention

FIG. 1 shows an example system 100 that supports the reduction of fill and improvement of quality of interlaced displays using multi-sampling. System 100 includes a graphics source 102, a frame buffer 104, a display system 106 and a monitor 108. Graphics source 102 can be any source of computer graphics such as a computer application producing graphics data, a video camera or a live video feed. Graphics source 102 can be implemented in software, hardware or any combination of the two. Preferably, graphic source 102 will be a computer application, running on a computer system, which produces graphics data. Frame buffer 104 can be any computer readable and writable medium such as a computer hard disk, a video graphics card, or random access memory. Preferably, frame buffer 104 will be random access memory. Display system 106 can be any system that provides interlaced video to a monitor. Display system 106 can be implemented in software, hardware or any combination of the two. Display system 106 is preferably a computer display system. Monitor 108 can be any monitor capable of displaying interlaced video. Monitor 108 is preferably a computer monitor supporting interlaced display.

In an embodiment of the present invention, system 100 resides on a Silicon Graphics® or SUN™ workstation running the IRIX™, Windows 95/98/NT™, LINUX™, or UNIX™ operating system. In another embodiment of the present invention, system 100 resides on a personal computer running the IRIX™, Mac OS™, Windows 95/98/NT™, LINUX™, or UNIX™ operating system.

Video Techniques

Figure 2:
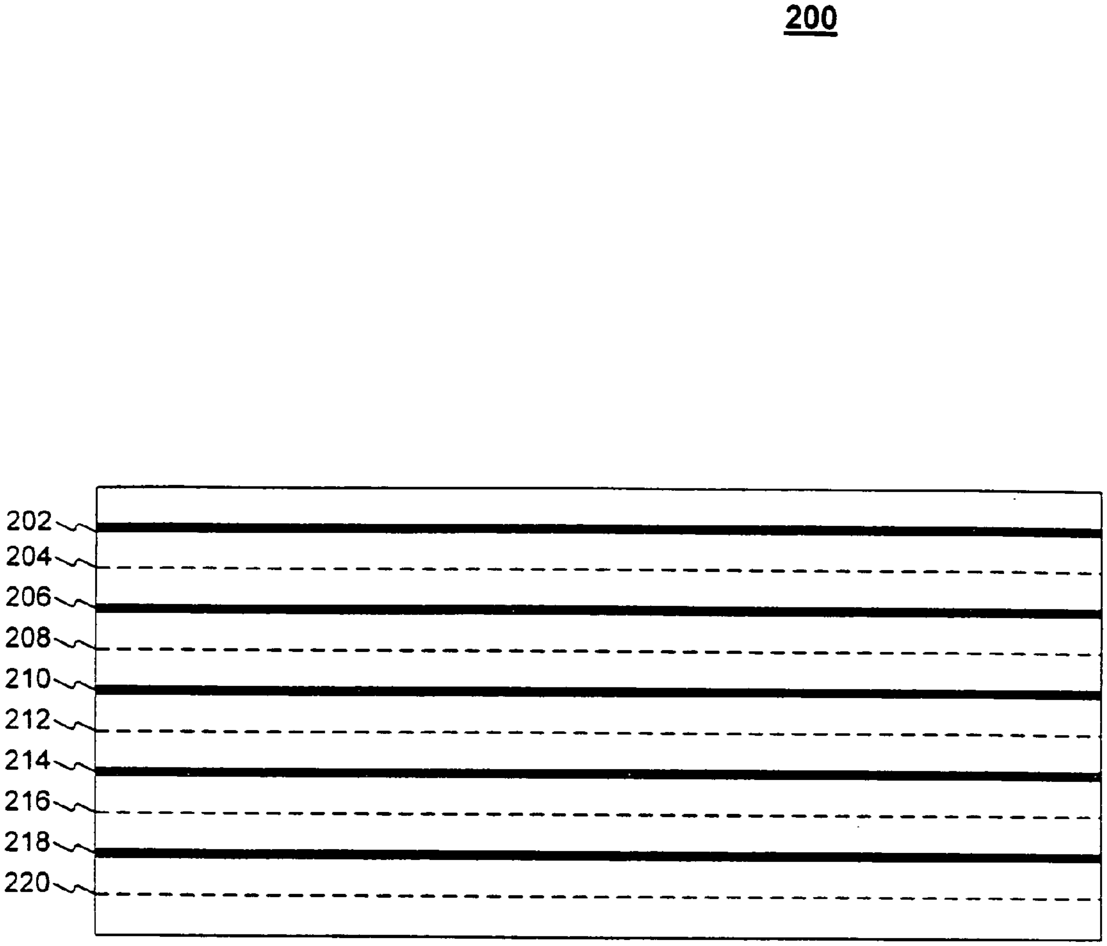
FIG. 2 illustrates an interlaced display.

FIG. 2 represents a frame 200 of interlaced video. A frame in an interlaced video consists of two fields, a first field and a second field. The first field consists of the odd-numbered lines of frame 200, while the second field consists of the even-numbered lines of frame 200. The first field is represented by the continuous lines 202, 206, 210, 214 and 218 in frame 200. The second field is represented by the dashed or broken lines 204, 208, 212, 216 and 220 in frame 200. In an NTSC frame of video, there would be 263 lines in the first field of the frame and 262 lines in the second field of the frame(totaling 525 lines).

The first and second fields are then interlaced, or interwoven, as shown in FIG. 2. That is, display system 106 alternately draws the first field and then the second field when frame 200 is drawn. In an NTSC frame of video, a new frame is drawn each one-thirtieth (1/30th) of a second, which results in one field being drawn each one-sixtieth (1/60th) of a second.

Figure 3:
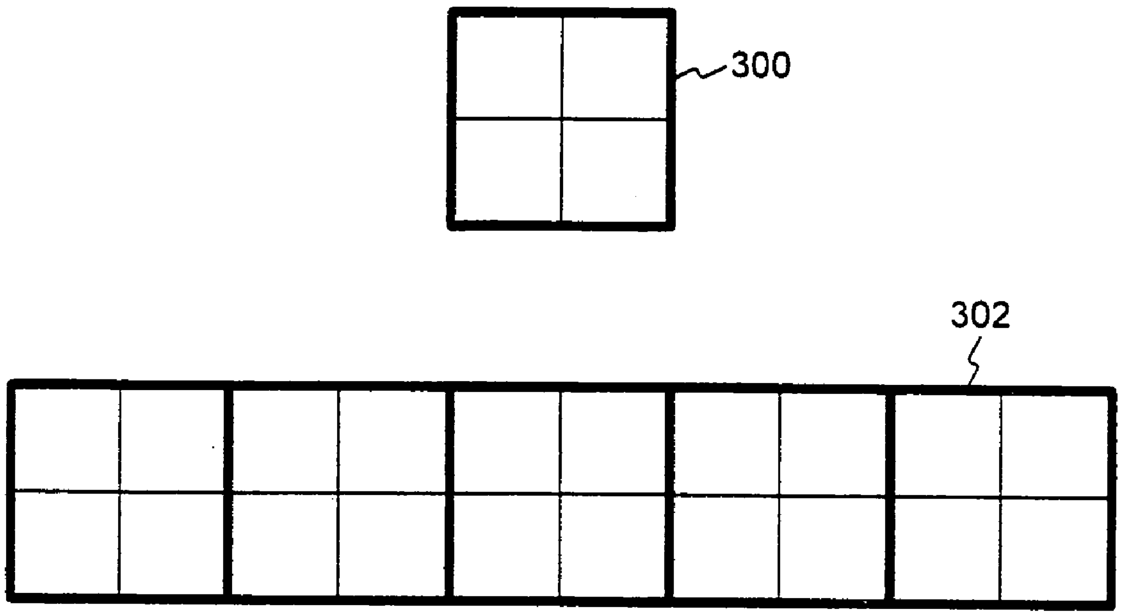
FIG. 3 illustrates a multi-sampled pixel and a multi-sampled line.

FIG. 3 represents the process of multi-sampling. Multi-sampling is well known in the art and can be performed in a variety of ways. Sub-pixel group 300 is a multi-sample of one pixel. That is, group 300 consists of information from which one pixel (a resultant pixel) can be calculated. Likewise, sub-pixel group 302 is a multi-sample of one line. That is, group 302 consists of information from which one line (a resultant line) can be calculated. Specifically, group 302 represents a multi-sample of five pixels comprising one line, wherein each pixel is multi-sampled by four sub-pixels. Note that line thickness in FIG. 3 represents pixel and sub-pixel boundaries.

Multi-sampling can be used to produce a high-precision resultant pixel. A resultant pixel or resultant line can be calculated using a variety of techniques. An example of such a technique is the averaging operation. The averaging operation consists of simply calculating an average of the data that exists in the sub-pixels. Using group 300, for example, the values of all four sub-pixels are averaged to produce the value of the resultant pixel. To calculate a resultant line using group 302, for example, a resultant pixel is calculated for each sub-pixel group in the line. Thus, using the averaging operation, a resultant line consists of the resultant pixels calculated by averaging each sub-pixel group. Other examples of techniques for calculating resultant lines includes pixel filtering, pixel decimation and pixel blending.

Multi-sampling is described in further detail in the following commonly owned U.S. Patents: U.S. Pat. No. 5,877,771 to Drebin et al, entitled "System and Apparatus for Supersampling Based on the Local Rate of Change in Texture," U.S. Pat. No. 5,369,739 to Akeley, entitled "Apparatus and Method for Generating Point Sample Masks in a Graphics Display System" and U.S. Pat. No. 6,091,425 to Law, entitled "Constant Multisample Image Coverage Mask." The foregoing U.S. Patents are hereby incorporated by reference in their entirety.

Filling the Frame Buffer

Figure 4:
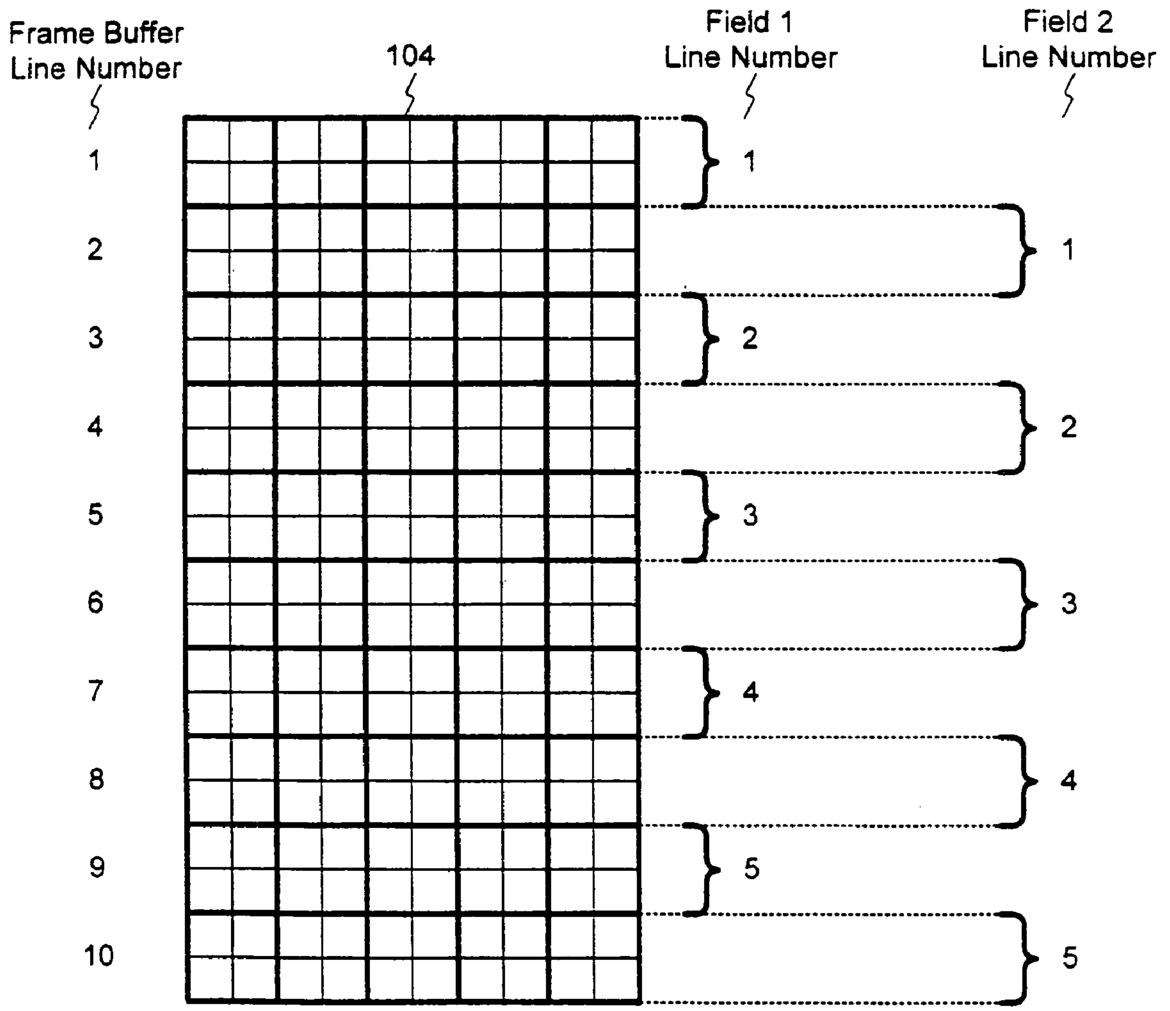
FIG. 4 illustrates the interleaved filling method for filling a frame buffer with interlaced data.
Figure 5:
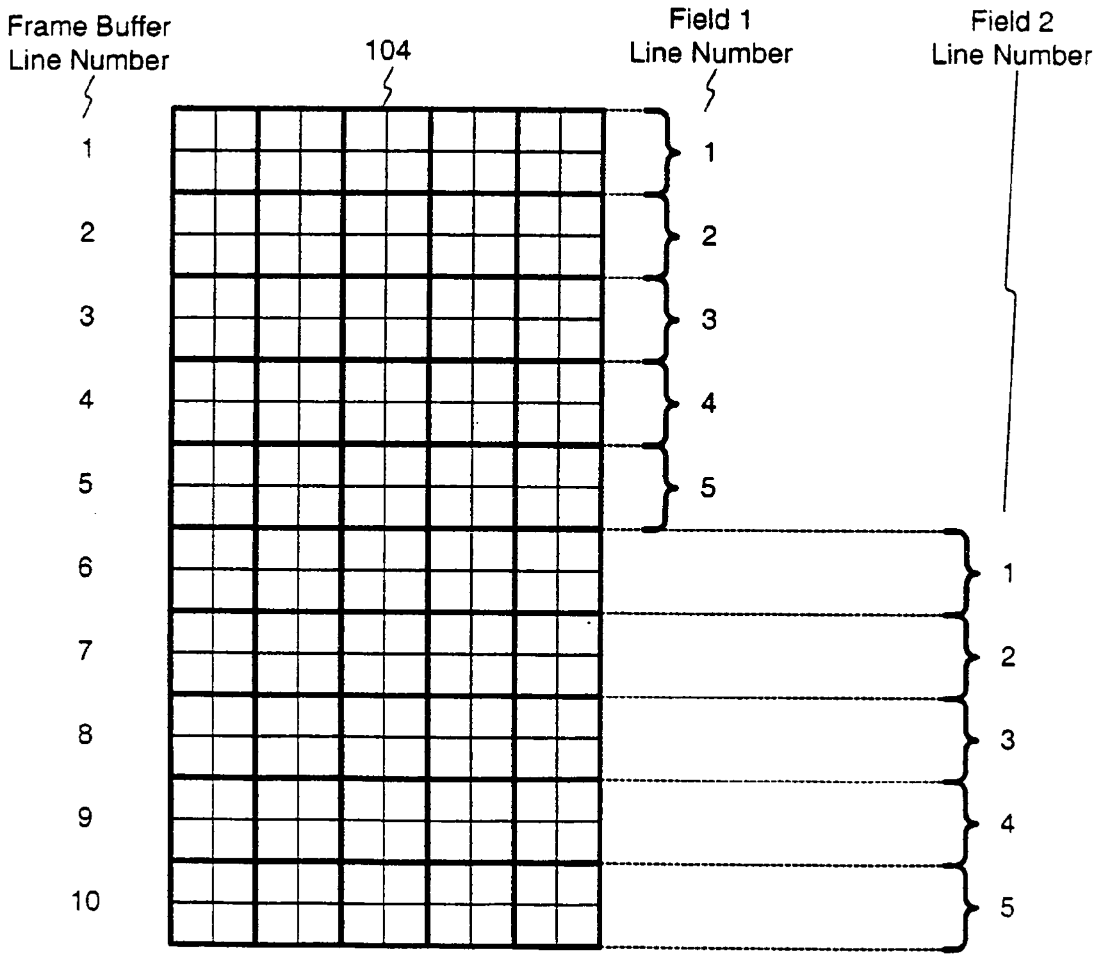
FIG. 5 illustrates the stacked filling method for filling a frame buffer with interlaced data.
Figure 6:
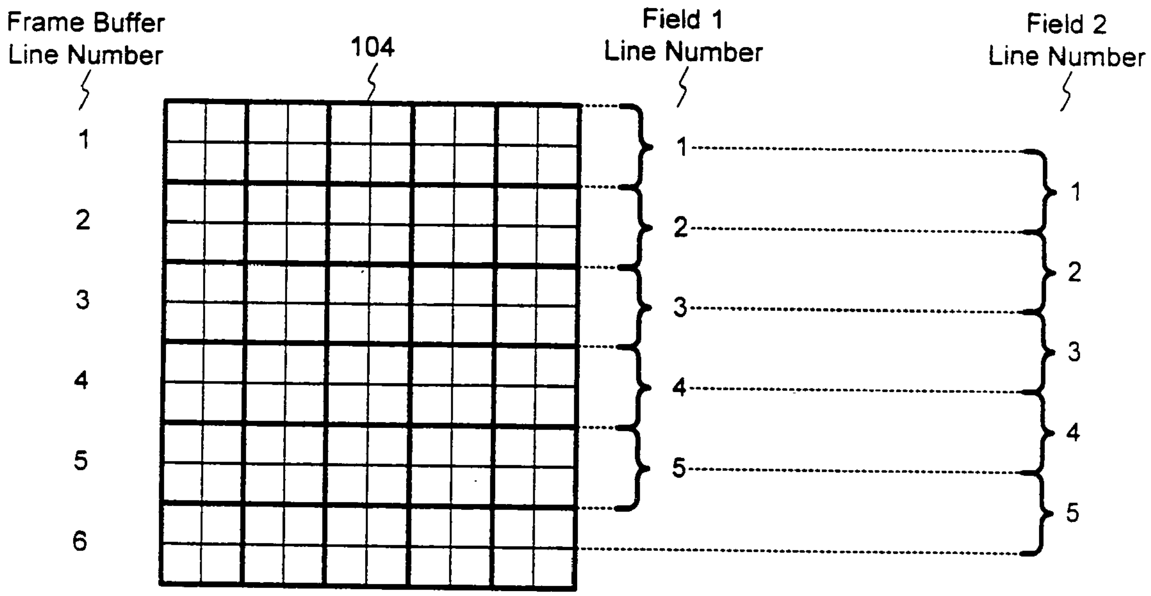
FIG. 6 illustrates the method of the present invention for filling a frame buffer with interlaced data.

FIG. 4, FIG. 5 and FIG. 6 show frame buffer 104 filled with interlaced data using various methods. These figures show frame buffer 104 filled with data from a 5×10 pixel frame. Each pixel in the frame is multi-sampled by four sub-pixels. Thus, each pixel in these figures has the same structure as sub-pixel group 300 in FIG. 3. Moreover, each of the ten lines in the frame consists of five pixels, wherein each pixel consists of four sub-pixels. Thus, each line in these figures has the same structure as sub-pixel group 302 in FIG. 3. As in FIG. 3, line thickness in FIG. 4, FIG. 5 and FIG. 6 represents pixel and sub-pixel boundaries.

The Interleaving Method

The interleaving method is a common method of filling a frame buffer.

FIG. 4 shows frame buffer 104 filled with interlaced frame data using the interleaving method. In a fashion similar to frame 200 in FIG. 2, frame buffer 104 is filled with multi-sampled lines from the first and second field of the frame in an alternating manner. Thus, odd-numbered lines of frame buffer 104 are filled with multi-sampled lines from the first field of the frame and even-numbered lines of frame buffer 104 are filled with multi-sampled lines from the second field of the frame. The information filled into frame buffer 104 can be read, or fetched, from frame buffer 104 in the same sequence as it is written. The manner in which frame buffer 104 is filled using the interleaving method is explained in greater detail below.

Figure 7:
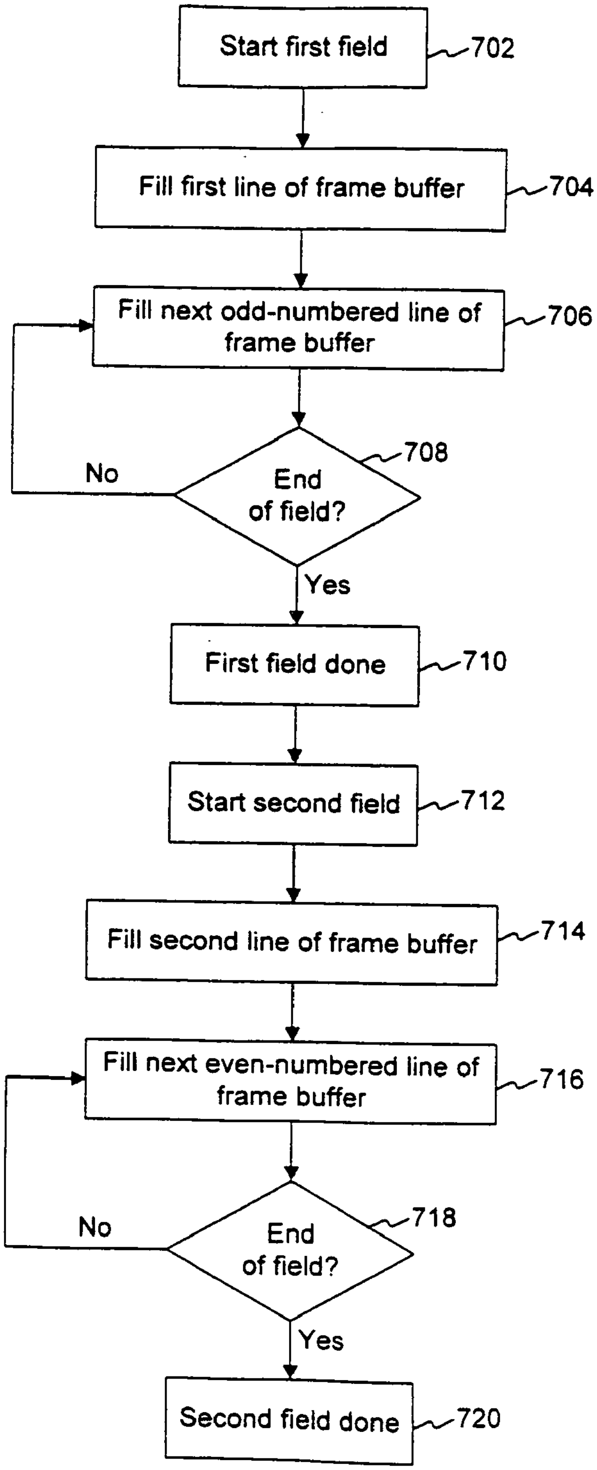
FIG. 7 is a flowchart depicting an embodiment of the operation and control flow of the interleaved filling method for filling a frame buffer with interlaced data.

FIG. 7 is a flowchart depicting an embodiment of the operation and control flow of the interleaved filling method for filling a frame buffer with interlaced data. FIG. 7 illustrates the process by which frame buffer 104 (as shown in FIG. 4) is filled using the interleaving method.

In a step 702, graphics source 102 commences writing the first field of a frame to frame buffer 104.

In a step 704, graphics source 102 fills the first line of frame buffer 104 with the first multi-sampled line of the first field of the frame.

In a step 706, graphics source 102 fills the next odd-numbered line of frame buffer 104 with the next multi-sampled line of the first field of the frame, i.e., the next odd-numbered multi-sampled line of the frame.

In a step 708, graphics source 102 determines whether all the multi-sampled lines of the first field have been filled into frame buffer 104, i.e., graphics source 102 determines whether all of the odd-numbered lines of the frame have been filled into frame buffer 104. If the determination of step 708 is negative, the process moves back to step 706. In this case, steps 706 and 708 are repeated until the determination of step 708 is affirmative, i.e., steps 706 and 708 are repeated until all of the multi-sampled lines of the first field have been filled into frame buffer 104.

If the determination of step 708 is affirmative, then, in a step 710, graphics source 102 has completed filling the first field, as indicated in a step 710.

In a step 712, graphics source 102 moves on to commence the filling of the second field.

In a step 714, graphics source 102 fills the second line of frame buffer 104 with the first multi-sampled line of the second field.

In a step 716, graphics source 102 fills the next even-numbered line of frame buffer 104 with the next multi-sampled line of the second field, i.e., the next even-numbered multi-sampled line of the frame.

In a step 718, graphics source 102 determines whether all the multi-sampled lines of the second field have been filled into frame buffer 104, i.e., graphics source 102 determines whether all of the even-numbered lines of the frame have been filled into frame buffer 104. If the determination of step 718 is negative, the process moves back to step 716. In this case, steps 716 and 718 are repeated until the determination of step 718 is affirmative, i.e., steps 716 and 718 are repeated until all the multi-sampled lines of the second field have been filled into frame buffer 104.

If the determination of step 718 is affirmative, then, graphics source 102 has completed filling the second field, as indicated in a step 720. Further, graphics source 102 has completed filling the entire frame into frame buffer 104.

The Stacked Method

The stacked method is also a common method of filling a frame buffer. FIG. 5 shows frame buffer 104 filled with interlaced data using the stacked method, in an alternative to the interleaved method. The first available lines in frame buffer 104 are filled first with multi-sampled lines from the first field of the frame. Then, the remaining lines of frame buffer 104 are filled with multi-sampled lines from the second field of the frame. Thus, the first half of all lines of frame buffer 104 are filled with multi-sampled lines from the first field, and the second half of all lines of frame buffer 104 are filled with multi-sampled lines from the second field. The information filled into frame buffer 104 can be read, or fetched, from frame buffer 104 in the same sequence as it is written.

The Method of the Present Invention

FIG. 6 shows frame buffer 104 filled with interlaced data using the method of the present invention. Using this method, the multi-sampled lines of the first field and the second field of the frame are present in frame buffer 104 using over-sampling. In a manner similar to the stacking method of FIG. 5, the first available lines of frame buffer 104 are filled with multi-sampled lines of the first field of the frame. However, in FIG. 6, the multi-sampled lines of the second field of the frame are calculated from the multi-sampled lines of the first field of the frame, i.e., the information pertaining to the first and second fields is over-sampled. This results in a smaller area requirement for frame buffer 104.

FIG. 6 illustrates the use of certain sub-pixels in the multi-sample group of more than one pixel, i.e., over-sampling. For example, it can be seen from FIG. 6 that the bottom sub-pixels of multi-sampled line 1 of the first field also act as the top sub-pixels of multi-sampled line 1 of the second field. Further, it can be seen that the top sub-pixels of multi-sampled line 2 of the first field also act as the bottom sub-pixels of multi-sampled line 1 of the second field. This paradigm is repeated until all of the multi-sampled lines of the first field are represented in frame buffer 104. Then, a final sub-pixel group is added to frame buffer 104 to complete the multi-sample of the last line of the second field. This sub-pixel group is added to the end of frame buffer 104 to represent the bottom sub-pixel group of the multi-sample of the last line of the second field. This is shown, for example, in the top portion of line 6 of frame buffer 104 in FIG. 6. The manner in which frame buffer 104 is filled using the method of the present invention is explained in greater detail below.

As shown in FIG. 6, the method of the present invention for filling frame buffer 104 requires a decreased amount of frame buffer space than the interleaving method (as shown in FIG. 4) and the stacked method (as shown in FIG. 5). Whereas the the interleaving method and the stacked method for filling frame buffer 104 requires frame buffer space equal to two times N (where N is equal to the number of multi-sampled lines in each field), the method of the present invention requires frame buffer space equal to only N+1 multi-sampled lines. For example, it can be seen that FIG. 4 and FIG. 5 (the interleaving method and the stacked method) shows ten frame buffer lines being used while FIG. 6 (the method of the present invention) shows only six lines being used. This feature reduces the number of read/write operations on memory and reduces fill processing because there is less fill information. In addition, the vertical over-sampling of lines in frame buffer 104 reduces the unwanted visual aberrations due to high-frequency vertical information. This feature increases image quality and increases visual accuracy of the display.

Figure 8:
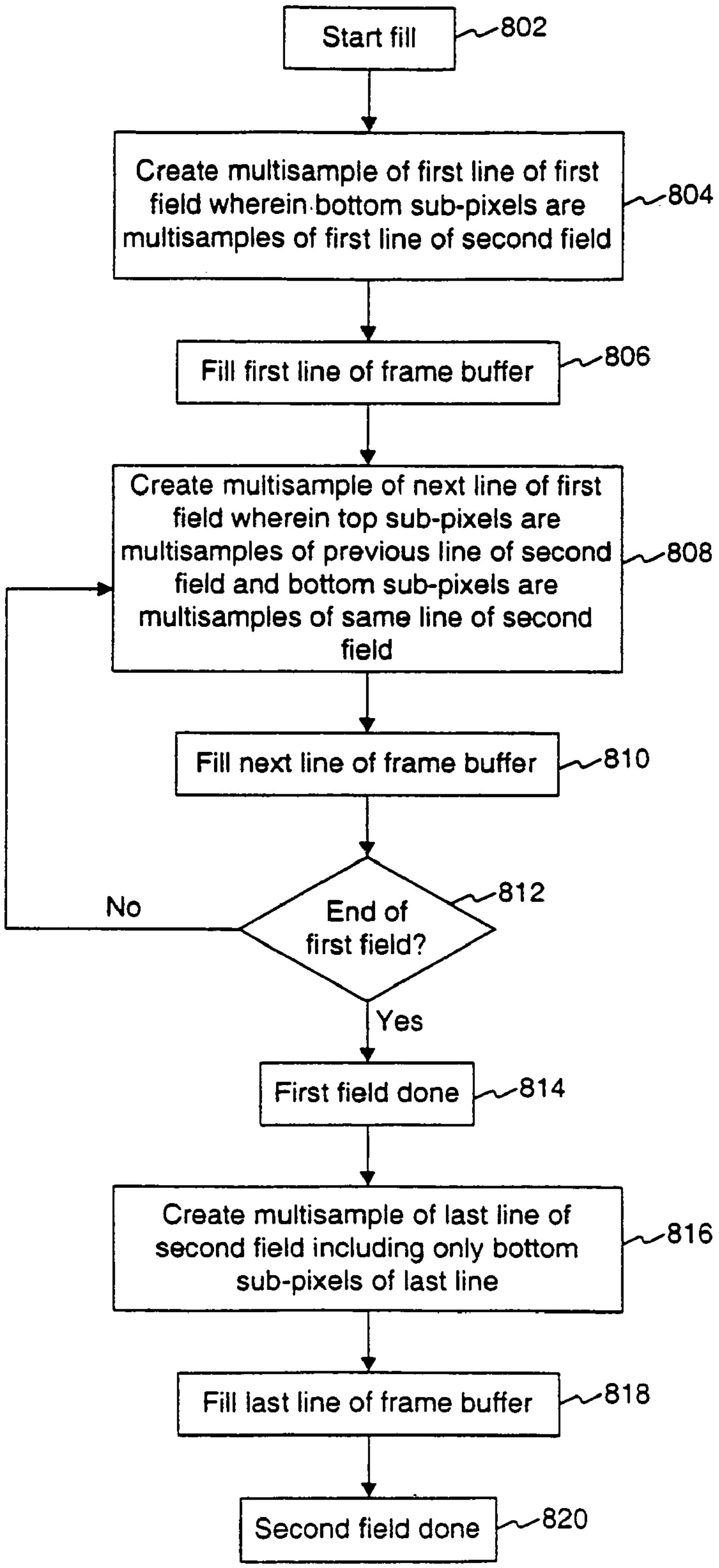
FIG. 8 is a flowchart depicting an embodiment of the operation and control flow of the method of the present invention for filling a frame buffer with interlaced data.

FIG. 8 is a flowchart depicting an embodiment of the operation and control flow of the method of the present invention for filling a frame buffer with interlaced data. FIG. 8 illustrates the process by which frame buffer 104 (as shown in FIG. 6) is filled using the method of the present invention.

In a step 802, graphics source 102 commences filling frame buffer 104.

In a step 804, graphics source 102 calculates a multi-sample of the first line of the first field, wherein the bottom sub-pixels of the calculated multi-sample are the top sub-pixels of a multi-sample of the first line of the second field. That is, the first line of the first field is partially over-sampled with the first line of the second field.

In a step 806, the multi-sample calculated in step 804 is written into the first available line of frame buffer 104.

In a step 808, graphics source 102 creates a multi-sample of the next line of the first field, wherein the bottom sub-pixels of the multi-sample are the top sub-pixels of a multi-sample of the next line of the second field. That is, the next line of the first field is partially over-sampled with the next line of the second field. Further, the top sub-pixels of the multi-sample are the bottom sub-pixels of a multi-sample of the previous line of the second field. That is, the next line of the first field is partially over-sampled with the previous line of the second field.

In a step 810, the multi-sample calculated in step 808 is written into the next available line of frame buffer 104.

In a step 812, graphics source 102 determines whether all the multi-sample lines of the first field have been filled into frame buffer 104. If the determination of step 812 is negative, the process moves back to step 808 In this case, steps 808 and 810 are repeated until the determination of step 812 is affirmative, i.e., steps 808 and 810 are repeated until all the multi-sampled lines of the first field have been filled into frame buffer 104.

If the determination of step 812 is affirmative, then graphics source 102 has completed filling the first field, as indicated in a step 814. Then, graphics source 102 moves on to complete the filling of the multi-sampled lines of the second field.

In a step 816, graphics source 102 creates a partial multi-sample consisting of the bottom sub-pixels of a multi-sample of the last line of the second field.

In a step 818, the multi-sample calculated in step 816 is written into the next available half-line (see line 6 of FIG. 6) of frame buffer 104.

In a step 820, graphics source 102 has completed filling the second field. Further, graphics source 102 has completed filling the entire frame into frame buffer 104.

It should be noted that each multi-sampled line of the first field in FIG. 6 is a plain multi-sample of a line of the first field. That is, frame buffer 104 is filled only with information from multi-sampled lines of the first field of the frame (with one exception). The exception is the last half-line of the frame buffer, which is filled with multi-sample information from the last line of the second field. As such, multi-samples of lines of the second field are calculated from the multi-samples of the lines of the first field, i.e., over-sampling. Over-sampling is described in greater detail above.

To illustrate the note above, it can be shown that each multi-sampled line of the first field (as written into frame buffer 104) in FIG. 6 is identical to each multi-sampled line of the first field in FIG. 4 and FIG. 5. Therefore, the information within frame buffer 104 in FIG. 5 can be copied into frame buffer 104 in FIG. 6 to represent the same frame. In this example, the data within frame buffer lines 1 through 5 in FIG. 5 can be copied to frame buffer lines 1 through 5 in FIG. 6. To complete the illustration the bottom sub-pixels from frame buffer line 10 in FIG. 5 can be copied to top portion of frame buffer line 6 in FIG. 6.

This illustrates that frame buffer 104 in FIG. 6 contains solely, with one exception, the multi-sampled lines of the first field. The exception is frame buffer line 6 in FIG. 6, which contains information from the second field.

Buffer Refresh Rates

Typically, an interlaced display refreshes a frame buffer with a new frame at frame rate. Thus, in an NTSC interlaced display, the frame buffer is refreshed with every one-thirtieth of a second. In this way, the entire frame is filled into the frame buffer every one-thirtieth of a second.

In an embodiment of the present invention, frame buffer 104 is refreshed, or updated, at field rate. Using the method of the present invention for filling frame buffer 104 (as described above), frame buffer 104 is refreshed at the same rate that fields are scanned onto the CRT. This method is an alternative to the commonly-used method of refreshing frame buffer 104 at frame rate. Whereas this commonly-used method refreshes frame buffer 104 with an entire frame of data at frame rate, in this embodiment of the present invention, frame buffer 104 is refreshed with one field of information at field rate.

Using NTSC video as an example, in this embodiment of the present invention, frame buffer 104 would be refreshed with one new field of data every one-sixtieth of a second. Referring to FIG. 6, each one-sixtieth of a second, lines 1–5 of one field would be filled into frame buffer 104. Accordingly, the field filled into frame buffer 104 would alternate every one-sixtieth of a second.

This feature results in the efficient synchronization of the system because the refresh rate of frame buffer 104 would be equal to the fetch rate. Thus, the information necessary for display would be available just in time for the fetch operation. This eliminates the existence of information in frame buffer 104 which is not needed at a particular time.

In another embodiment of the present invention, the resultant lines are calculated upon fetch and not upon fill. That is, the information that is to be displayed (the resultant lines) is not calculated when frame buffer 104 is filled. Upon fill of frame buffer 104, only multi-sampled lines are stored in frame buffer 104. The resultant lines are calculated when the multi-sampled lines stored in frame buffer 104 are fetched for display. This reduces fill processing by not requiring the fill operation to accomplish this additional task. This feature reduces processing burdens and more evenly distributes processing between fetch and fill operations.

Environment

Figure 9:
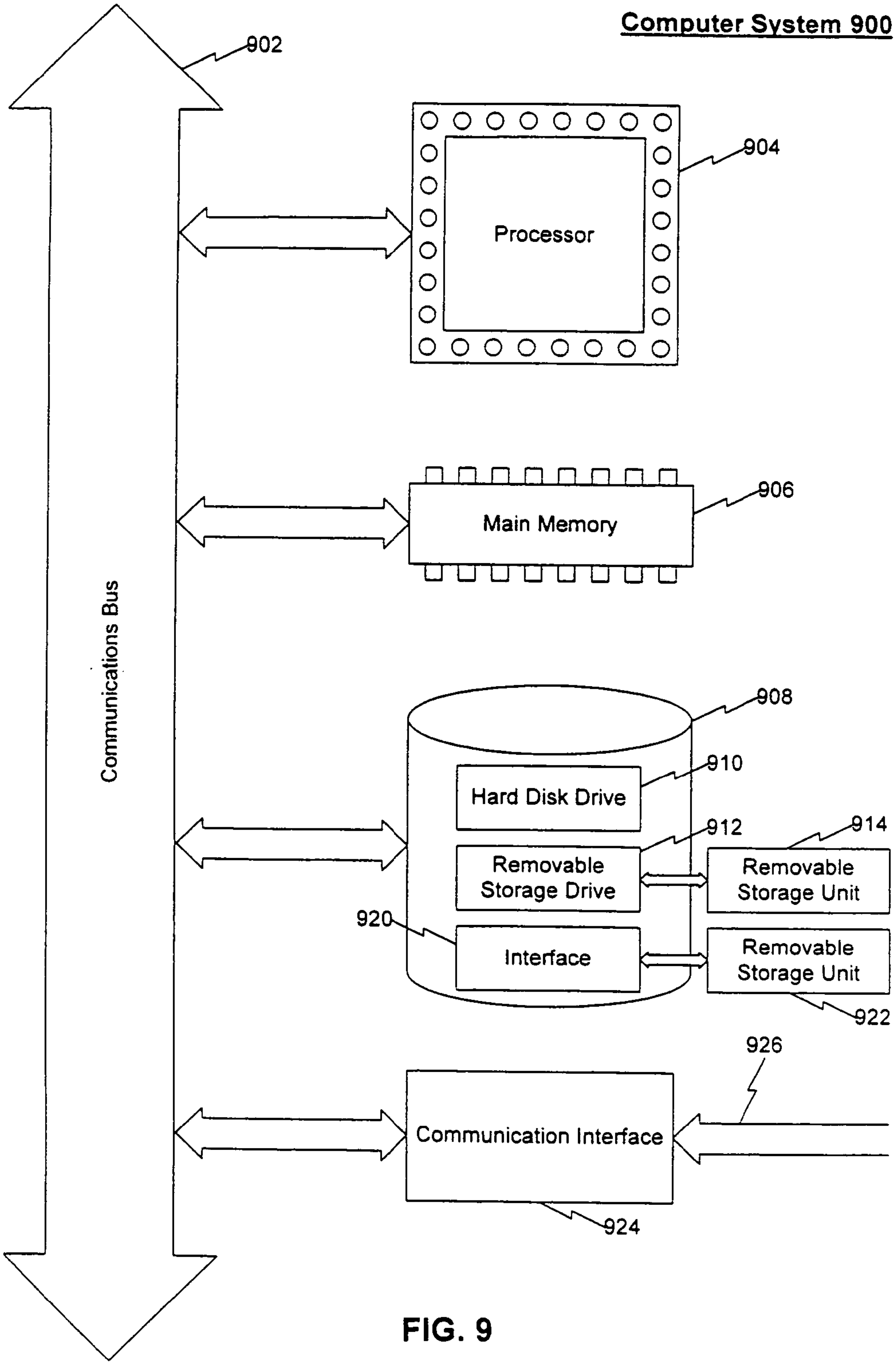
FIG. 9 is an example computer system and computer program product that can be used to implement the present invention.

The functions described above can be implemented using hardware or a combination of hardware and software. Consequently, the invention can be implemented or a computer system or other processing system. An example of such a computer system 900 is shown in FIG. 9. In the present invention, for example, system 100 (see FIG. 1) can be implemented in computer system 900.

The computer system 900 represents any single or multi-processor computer. Single-threaded and multi-threaded computers can be used. Unified or distributed memory systems can be used.

The computer system 900 includes one or more processors, such as processor 904. One or more processors 904 can execute software implementing the operations described in the flowcharts of FIG. 7 and FIG. 8. Each processor 904 is connected to a communication bus 902 (e.g., cross-bar or network). Various software embodiments are described in terms of this exemplary computer system. After reading this description, it will become apparent to a person skilled in the relevant art how to implement the invention using other computer systems and/or computer architectures.

Computer system 900 also includes a main memory 906, preferably random access memory (RAM), and can also include a secondary memory 908. The secondary memory 908 can include, for example, a hard disk drive 910 and/or a removable storage drive 912, representing a floppy disk drive, a magnetic tape drive, an optical disk drive, etc. The removable storage drive 912 reads from and/or writes to a removable storage unit 914 in a well known manner. Removable storage unit 914 represents a floppy disk, magnetic tape, optical disk, etc., which is read by and written to by removable storage drive 912. As will be appreciated, the removable storage unit 914 includes a computer usable storage medium having stored therein computer software and/or data.

In alternative embodiments, secondary memory 908 can include other means for allowing computer programs or other instructions to be loaded into computer system 900. Such means can include, for example, a removable storage unit 922 and an interface 920. Examples can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 can also include a communications interface 924. Communications interface 924 allows software and data to be transferred between computer system 900 and external devices via communications path 926. Examples of communications interface 920 can include a modem, a network interface (such as Ethernet card), a communications port, etc. Software and data transferred via communications interface 924 are in the form of signals which can be electronic, electromagnetic, optical or other signals capable of being received by communications interface 924, via communications path 926. Note that communications interface 924 provides a means by which computer system 900 can interface to a network such as the Internet.

The present invention can be implemented using software running (that is, executing) in an environment similar to that described above with respect to FIG. 9. In this document, the term "computer program product" is used to generally refer to removable storage unit 914, a hard disk installed in hard disk drive 910, or a carrier wave carrying software over a communication path 926 (wireless link or cable) to communication interface 924. A computer useable medium can include magnetic media, optical media, or other recordable media, or media that transmits a carrier wave. These computer program products are means for providing software to computer system 900.

Computer programs (also called computer control logic) are stored in main memory 906 and/or secondary memory 908. Computer programs can also be received via communications interface 924. Such computer programs, when executed, enable the computer system 900 to perform the features of the present invention as discussed herein. In particular, the computer programs, when executed, enable the processor 904 to perform the features of the present invention. Accordingly, such computer programs represent controllers of the computer system 900.

In an embodiment where the invention is implemented using software, the software can be stored in a computer program product and loaded into computer system 900 using removable storage drive 912, hard drive 910, or communications interface 924. Alternatively, the computer program product can be downloaded to computer system 900 over communications path 924. The control logic (software), when executed by the one or more processors 904, causes the processor(s) 904 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

CONCLUSION

The previous description of the preferred embodiments is provided to enable any person skilled in the art to make or use the present invention. The various modifications to these embodiments will be readily apparent to those skilled in the art, and the generic principles defined herein can be applied to other embodiments without the use of inventive faculty. Thus, the present invention is not intended to be limited to the embodiments shown herein but is to be accorded the widest scope consistent with the principles and novel features disclosed herein.

What is claimed is:

1. A computer system for filling into a frame buffer for an interlaced display a frame having a first field and a second field, the method comprising:

(a) means for calculating a first multi-sample of the first line of the first field, wherein bottom sub-pixels of said first multi-sample are the top sub-pixels of a multi-sample of the identical-numbered line of the second field;

(b) means for writing said first multi-sample into the frame buffer;

(c) means for calculating a next multi-sample of the next line of the first field, wherein top sub-pixels of said next multi-sample are the bottom sub-pixels of a multi-sample of the previous line of the second field, and wherein bottom sub-pixels of said next multi-sample are the top sub-pixels of a multi-sample of the identical-numbered line of the second field; and (d) means for writing said next multi-sample into the frame buffer;

(e) means for performing steps (c) and (d) for each line of the first field;

(f) means for calculating a last multi-sample of the last line of the second field, wherein said last multi-sample consists of sub-pixels of a full multi-sample of the last line of the second field; and (g) means for writing said last multi-sample into the frame buffer.

2. A computer-readable medium having computer-executable instructions, wherein the computer-executable instructions perform:

(a) calculating a first multi-sample of the first line of the first field, wherein bottom sub-pixels of said first multi-sample are the top sub-pixels of a multi-sample of the identical-numbered line of the second field;

(b) writing said first multi-sample into the frame buffer;

(c) calculating a next multi-sample of the next line of the first field, wherein top sub-pixels of said next multi-sample are the bottom sub-pixels of a multi-sample of the previous line of the second field, and wherein bottom sub-pixels of said next multi-sample are the top sub-pixels of a multi-sample of the identical-numbered line of the second field; and (d) writing said next multi-sample into the frame buffer;

(e) performing steps (c) and (d) for each line of the first field;

(f) calculating a last multi-sample of the last line of the second field, wherein said last multi-sample consists of sub-pixels of a full multi-sample of the last line of the second field; and (g) writing said last multi-sample into the frame buffer.

3. A computer system for providing a frame having a first field and a second field to an interlaced display, comprising:

a frame buffer;

a first multi-sample having a first field with a first line that is calculated, wherein bottom sub-pixels of said first multi-sample are the top sub-pixels of a multi-sample of the identical-numbered line of the second field;

a next multi-sample of the next line of the first field that is calculated, wherein top sub-pixels of said next multi-sample are the bottom sub-pixels of a multi-sample of the previous line of the second field, and wherein bottom sub-pixels of said next multi-sample are the top sub-pixels of a multi-sample of the identical-numbered line of the second field, and the next multi-sample is written into the frame buffer;

a last multi-sample of the last line of the second field that is calculated, wherein said last multi-sample consists of sub-pixels of a full multi-sample of the last line of the second field, and wherein said last multi-sample is written into the frame buffer.

* * * * *